No. 631,040. Patented Aug. 15, 1899.
J. E. GREENAWALT.
PROCESS OF EXTRACTING PRECIOUS METALS FROM THEIR ORES.
(Application filed Apr. 14, 1898. Renewed Jan. 17, 1899.)
(No Model.)
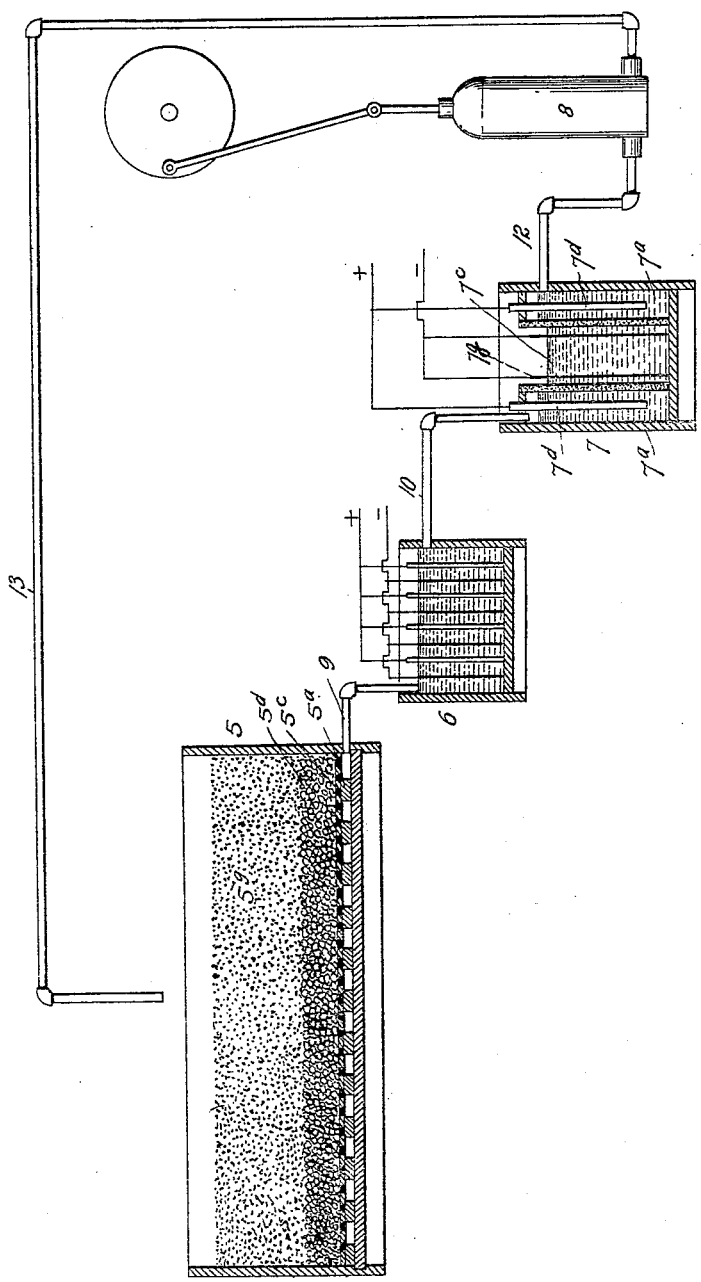
Witnesses
Inventor
J. E. Greenawalt
By his Attorney

UNITED STATES PATENT OFFICE.

JOHN E. GREENAWALT, OF DENVER, COLORADO, ASSIGNOR OF ONE-HALF TO WILLIAM ROBINSON, OF SAME PLACE.

PROCESS OF EXTRACTING PRECIOUS METALS FROM THEIR ORES.

SPECIFICATION forming part of Letters Patent No. 631,040, dated August 15, 1899.

Application filed April 14, 1898. Renewed January 17, 1899. Serial No. 702,471. (No specimens.)

*To all whom it may concern:*

Be it known that I, JOHN E. GREENAWALT, a citizen of the United States of America, residing at Denver, in the county of Arapahoe and State of Colorado, have invented certain new and useful Improvements in Processes for the Extraction of Precious Metals from their Ores; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in processes for the extraction of the metals from their ores, my object being to accomplish the economical treatment of ores carrying gold or gold and silver by means of a strong solution of chlorids containing small quantities of chlorin and bromin and wherein the same solution is used over and over again by being regenerated in the positive compartment of an electrolytic cell, the solution being kept away from the negative chamber of the cell.

In carrying out my process I provide a dilute though effective solvent for gold and silver, which can be applied to the ore in open tanks, so that the operation can be carried on at a low cost, thus making it practicable for the treatment of ores of such low grade that their successful commercial treatment is impossible by processes heretofore known.

In the modern barrel chlorination process the chlorin is used in a very concentrated form, requiring expensive apparatus, while at the same time the treatment is too expensive to be applicable to the vast majority of ores.

I have discovered as a result of my investigation that if a comparatively strong solution of sodium chlorid is passed through the positive compartment of an electrolytic cell a solution is produced containing chlorin and hypochlorous acid, which dissolves gold and silver from their ores as completely as concentrated chlorin, providing it is given sufficient time, and, further, that the solution can be applied to the ore in open tanks without detriment from chlorin fumes.

In carrying out my process I obtain satisfactory results by employing the apparatus illustrated in the accompanying drawing, in which the numeral 5 designates an ore-leaching vat; 6, a precipitating-tank in which the metals are saved; 7, a regenerating electrolytic cell, and 8 a pump for transferring the regenerated solution from the last-named cell to the ore-vat 5. The vat is open at the top. On its bottom are placed narrow separated strips $5^a$. Above these strips is placed a perforated board covering $5^c$, upon which is in turn placed a stratum of gravel $5^d$, which is coarsest at the bottom and increases in fineness toward the top, where it consists of fine sand. The ore $5^g$ is then placed in this tank above the filtering material. The bottom of the leaching-vat is connected with the precipitating-tank 6 by a conduit 9. This tank is connected with the positive compartment $7^a$ of the cell 7 by a conduit 10. From the compartment $7^a$ of this cell the solution passes to the pump 8 by way of a conduit 12, and a conduit 13 carries the solution from the pump back to the leaching-vat.

The first step in the preparation of the ore is to crush it, so that it will pass through a twenty or thirty mesh screen, after which the ore is subjected to an oxidizing or chloridizing roasting, as the nature of the ore may demand. When the ore carries silver, I prefer a chloridizing roast, as the silver will then be in a condition to be readily dissolved by the brine. The ore is then placed in the vat 5. The first step after placing the ore in the vat is to wash it thoroughly with water when necessary to remove soluble salts, which would otherwise absorb and consume the active solvent for gold. Ores containing lime or magnesia or copper can be advantageously treated with a dilute solution of mineral acids, preferably sulfuric, before the gold-dissolving solution is applied, in order to further remove compounds which would absorb the active solvent of the precious metals. The ore is then ready for the application of the gold solvent. This solution I make as follows: I take a solution of sodium chlorid and add to this from one to one-half of one per cent. of bromin, either in the form of bromin or as a bromid salt. The stronger the solution is of sodium chlorid the better. In practice it is well to keep it as close to the saturated point as practicable, for on this depends the property of the solution for dissolving chlorid of silver and also gives the solution the necessary electrical conductivity in the precipitating-tank and regenerating-cell. The salt also furnishes chlorin and hypochlorous acids, both of which are active solvents for gold. I prefer to add small quantities of bromin to the solution, as this element is far more soluble in water than chlorin, and hence a stronger gold-dissolving solution can be produced. After the solution has been in use for some time it becomes charged with metallic chlorids, especially ferric chlorid; but these may be considered equivalent to the sodium chlorid. The solution is then passed through the positive compartment $7^a$ of the electrolytic cell and kept separate and distinct from the products of electrolysis in the negative compartment $7^c$ of such cell. This cell preferably consists of a round wooden tank, the interior of which is divided into two compartments $7^a$ and $7^c$ by a large porous clay pipe. The one compartment, the negative, is inside the pipe, while the other or positive compartment is between the exterior of the pipe and the interior of the wooden tank. This last-named space contains carbon rods $7^d$, which are connected to the positive pole of the dynamo. (Not shown.) The negative compartment contains suitable cathode-rods $7^g$, of iron or copper, which are connected with the negative pole of the dynamo or electrical source. The electrolyte in the negative compartment of the cell preferably consists of a strong solution of caustic soda with a small percentage of sodium chlorid. When the current passes from the carbon rods through the porous pipe to the cathode-rods, decomposition takes place, sodium being released at the cathode, chlorin and bromin at the anode. The free chlorin displaces the bromin from its salts, so that a large percentage of the bromin is released. There is also some hypochlorous acid formed, which is equivalent to chlorin in its action on gold. The density of the current in this cell is preferably from five to ten amperes per square foot of anode-surface, requiring from five to eight volts. The solution in its passage around and among the carbons becomes charged with chlorin, bromin, and hypochlorous acid. It then falls to the pump 8 by way of the conduit 12. This pump must be constructed to resist the action of the solution. By it the solution is forced to the surface of the ore in the vat 5, through which it is allowed to percolate. In doing so the gold and silver are dissolved and the active agents in the solution consumed. The solution then passes from the bottom of the ore-vat to the precipitating-tank 6 by way of the conduit 9. This tank is filled with carbon and lead plates arranged alternately and about one and one-half inches apart. The carbon plates are the anodes and the lead plates the cathodes of the tank.

The solution is circulated as much as possible, so that a fresh surface of the solution is presented to the surface of the lead plates. The gold and silver, with perhaps some copper, are precipitated upon the lead plates. It is desirable to employ a weak current for this work, in order not to precipitate the base metals and to prevent the liberation of chlorin to such an extent as to interfere with the precipitation of gold and silver. The curent density is preferably about .07 of an ampere per square foot of cathode, requiring from one to two volts. The solution after leaving the precipitating-tank again passes to the positive compartment of the regenerating electrolytic cell. In this manner the solution is continuously circulated through the apparatus until a high percentage of the gold and silver has been extracted from the ore and deposited in the precipitating-tank.

Having thus described my invention, what I claim is—

1. A process for the treatment of gold and silver ores which consists, first, in properly roasting the pulverized ore, second, in placing the ore in a filtering-vat, third, in passing through the ore an electrolyzed solution consisting of a solution of chlorids, chiefly sodium and ferric chlorids, and small quantities of chlorin and hypochlorous acid, with such other compounds as result from the electrolysis of a chlorid solution, fourth, passing the solution after it leaves the ore through a precipitating-tank, fifth, passing the solution after it leaves the precipitating-tank, through the positive or anode compartment of an electrolytic cell keeping the solution separate and distinct from the solution in the negative or cathode compartment in the cell, and sixth, returning the solution from the regenerating-cell to the ore in the vat, and passing it again to the precipitating-tank, again to the regenerating-cell, and again to the ore as often as may be required to effect the necessary saving of the values.

2. A process for the treatment of gold and silver ores which consists, first, in properly roasting the pulverized ore, second, in placing the ore in a filtering-vat, third, washing the ore to remove soluble salts, fourth, in passing through the ore an electrolyzed solution consisting of a solution of chlorids, chiefly sodium and ferric chlorids, and small quantities of chlorin and hypochlorous acid, with such other compounds as result from the electrolysis of a chlorid solution, fifth, passing the solution after it leaves the ore, through a precipitating-tank, sixth, passing the solution after it leaves the precipitating-tank through the positive or anode compartment of an electrolytic cell, keeping the solution separate and distinct from the solution in the negative or cathode compartment of the cell, and seventh, returning the solution from the regenerating-cell to the ore in the vat, and passing it thence to the precipitating-tank, again to the regenerating-cell, and again to the ore as often as may be required to effect the necessary saving of the values.

3. A process for the treatment of gold and silver ores which consists, first, in properly roasting the pulverized ore, second, placing the ore in a filtering-vat, third, in passing through the ore an electroylzed solution consisting of a solution of chlorids, chiefly sodium and ferric chlorids, with a small percentage of bromids, and small quantities of chlorin, bromin, and hypochlorous acid, with such other compounds as result from the electrolysis of chlorid and bromid solution, fourth, passing the solution after it leaves the ore through a precipitating-tank, fifth, passing the solution after it leaves the precipitating-tank through the positive or anode compartment of an electrolytic cell, keeping the solution separate and distinct from the solution in the negative or cathode compartment of the cell, and sixth, returning the solution from the regenerating-cell to the ore in the vat, and passing it thence to the precipitating-tank, again to the regenerating-cell, and again to the ore as often as may be required to effect the necessary saving of the values.

4. A process for the treatment of gold and silver ores which consists, first, in properly roasting the pulverized ore, second, placing the ore in a filtering-vat, third, washing the ore to remove soluble salts, fourth, in passing through the ore an electrolyzed solution consisting of a solution of chlorids, chiefly sodium and ferric chlorids, with a small percentage of bromids, and small quantities of chlorin, bromin and hypochlorous acid, with such other compounds as result from the electrolysis of a chlorid and bromid solution, fifth, passing the solution after it leaves the ore through a precipitating-tank, sixth, passing the solution after it leaves the precipitating-tank through the positive or anode compartment of an electrolytic cell, keeping the solution separate and distinct from the solution in the negative or cathode compartment of the cell, and seventh, returning the solution from the regenerating-cell to the ore in the vat, and passing it thence to the precipitating-tank, again to the regenerating-cell, and again to the ore as often as may be required to effect the necessary saving of the values.

In testimony whereof I affix my signature in presence of two witnesses.

JOHN E. GREENAWALT.

Witnesses:
A. J. O'BRIEN,
EDITH HIMSWORTH.